United States Patent
Braley et al.

(10) Patent No.: US 11,195,064 B2
(45) Date of Patent: Dec. 7, 2021

(54) CROSS-MODAL SENSOR DATA ALIGNMENT

(71) Applicant: Waymo LLC, Mountain View, CA (US)

(72) Inventors: Colin Andrew Braley, Mountain View, CA (US); Volodymyr Ivanchenko, Redwood City, CA (US); Yu Zhang, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 15 days.

(21) Appl. No.: 16/509,152

(22) Filed: Jul. 11, 2019

(65) Prior Publication Data

US 2021/0012166 A1 Jan. 14, 2021

(51) Int. Cl.
*G06K 9/62* (2006.01)
*G06T 7/32* (2017.01)
*G06T 7/73* (2017.01)
*G06K 9/00* (2006.01)

(52) U.S. Cl.
CPC ....... *G06K 9/6289* (2013.01); *G06K 9/00791* (2013.01); *G06T 7/32* (2017.01); *G06T 7/74* (2017.01); *G06T 2207/10028* (2013.01); *G06T 2207/10044* (2013.01); *G06T 2207/20081* (2013.01); *G06T 2207/20084* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 8,290,305 B2 | 10/2012 | Minear et al. | |
| 9,052,721 B1 | 6/2015 | Dowdall et al. | |
| 2019/0120947 A1* | 4/2019 | Wheeler | G01S 17/42 |
| 2019/0206071 A1 | 7/2019 | Baidu | |
| 2020/0286247 A1* | 9/2020 | Niesen | G01S 13/867 |

OTHER PUBLICATIONS

Hafner et al, "A cross-modal distillation network for person re-identification in RGB-Depth," arXiv, Nov. 5, 2018, 18 pages.

(Continued)

*Primary Examiner* — Vikkram Bali
(74) *Attorney, Agent, or Firm* — Fish & Richardson P.C.

(57) ABSTRACT

Methods, systems, and apparatus, including computer programs encoded on a computer storage medium, for determining an alignment between cross-modal sensor data. In one aspect, a method comprises: obtaining (i) an image that characterizes a visual appearance of an environment, and (ii) a point cloud comprising a collection of data points that characterizes a three-dimensional geometry of the environment; processing each of a plurality of regions of the image using a visual embedding neural network to generate a respective embedding of each of the image regions; processing each of a plurality of regions of the point cloud using a shape embedding neural network to generate a respective embedding of each of the point cloud regions; and identifying a plurality of region pairs using the embeddings of the image regions and the embeddings of the point cloud regions.

20 Claims, 5 Drawing Sheets

(56) References Cited

OTHER PUBLICATIONS

Maalej et al, "VANETs Meets Autonomous Vehicles: A multimodal 3D Environment Learning Approach," arXIv, May 24, 2017, 7 pages.
Maturana et al, "VoxNet: a 3D convolutional neural network or real time object recognition," 2015, IEEE Xplore, 7 pages.
Muja et al, "Fast approximate nearest neighbors with automatic algorithm configuration," 2009, VISAPP, 10 pages.
Qi et al, "PointNet: Deep learning on points set for 3D classification and segmentation," arXiv, Apr. 10, 2017, 19 pages.
Qi et al, "PointNet++: Deep hierarchical feature learning on point sets in a metric space," 2017, NIPS, 14 pages.
PCT International Search Report and Written Opinion in International Appln. No. PCT/US2020/040670, dated Oct. 22, 2020, 11 pages.
Wang et al., "Deep Metric Learning with Angular Loss," Proceedings of the IEEE International Conference on Computer Vision, Oct. 2017, pp. 2593-2601.
Zakharov et al., "3D Object Instance Recognition and Pose Estimation Using Triplet Loss with Dynamic Margin," 2017 IEEE/RSJ International Conference on Intelligent Robots and Systems, Sep. 2017, 8 pages.
Barsan et al., "Learning to localize using a LiDAR intensity map." CoRR, Dec. 2020, arxiv.org/abs/2012.10902, 8 pages.
Patel et al., "Sensor modality fusion with CNNs for UGV autonomous driving indoor environments," 2017 IEEE/RSJ International Conference on Intelligent Robots and Systems, Dec. 2017, 8 pages.

* cited by examiner

CROSS-MODAL SENSOR DATA ALIGNMENT

BACKGROUND

This specification relates to processing cross-modal sensor data generated by camera sensors and surveying sensors.

A camera sensor can generate an image that characterizes a visual appearance of an environment. A surveying sensor (e.g., a radar or lidar sensor) can generate a point cloud that characterizes a three-dimensional (3D) geometry of an environment.

Sensor data generated by camera sensors and surveying sensors can be processed by machine learning models. Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that can determine an alignment between cross-modal sensor data. Determining an alignment between two sets of sensor data (e.g., between image data and point cloud data) refers to determining a mapping between respective regions of the two sets of sensor data that characterize the same area of the environment.

According to a first aspect there is provided a method including obtaining: (i) an image, generated by a camera sensor, that characterizes a visual appearance of an environment, and (ii) a point cloud comprising a collection of data points, generated by a surveying sensor, that characterizes a three-dimensional geometry of the environment. Each data point defines a respective three-dimensional spatial position of a point on a surface in the environment. Each of multiple regions of the image are processed using a visual embedding neural network to generate a respective embedding of each of the image regions. Each of multiple regions of the point cloud are processed using a shape embedding neural network to generate a respective embedding of each of the point cloud regions. A set of region pairs are identified using the embeddings of the image regions and the embeddings of the point cloud regions. Each region pair includes a respective image region and a respective point cloud region that characterize the same respective area of the environment.

In some implementations, the surveying sensor is a lidar sensor or a radar sensor.

In some implementations, the camera sensor and the surveying sensor are mounted on a vehicle.

In some implementations, each data point in the point cloud additionally defines a strength of a reflection of a pulse of light that was transmitted by the surveying sensor and that reflected from the point on the surface of the environment at the three-dimensional spatial position defined by the data point.

In some implementations, the method further includes using the set of region pairs to determine whether the camera sensor and the surveying sensor are accurately calibrated.

In some implementations, the method further includes obtaining data defining a position of an object in the image, and identifying a corresponding position of the object in the point cloud based on: (i) the position of the object in the image, and (ii) the set of region pairs.

In some implementations, identifying the corresponding position of the object in the point cloud based on: (i) the position of the object in the image, and (ii) the set of region pairs, includes identifying particular regions pairs, such that for each particular region pair, the image region of the region pair corresponds to the position of the object in the image. The position of the object in the point cloud is determined based on the respective point cloud region of each particular region pair.

In some implementations, the method further includes obtaining data defining a position of an object in the point cloud, and identifying a corresponding position of the object in the image based on: (i) the position of the object in the point cloud, and (ii) the plurality of region pairs.

In some implementations, identifying the corresponding position of the object in the image based on: (i) the position of the object in the point cloud, and (ii) the set of region pairs, includes identifying particular regions pairs, such that for each particular region pair, the point cloud region of the region pair corresponds to the position of the object in the point cloud. The position of the object in the image is determined based on the respective image region of each particular region pair.

In some implementations, the method further includes projecting the point cloud onto a two-dimensional image plane that is aligned with the image using the plurality of region pairs. The image and the projected point cloud are processed using a neural network to generate a neural network output.

In some implementations, the neural network output includes data identifying positions of objects in the environment.

In some implementations, the multiple image regions cover the image.

In some implementations, the multiple point cloud regions cover the point cloud.

In some implementations, identifying the region pairs using the embeddings of the image regions and the embeddings of the point cloud regions includes identifying a set of embedding pairs, such that each given embedding pair includes the embedding of a given image region and the embedding of a given point cloud region. A respective region pair corresponding to each of the embedding pairs is identified, where the region pair corresponding to a given embedding pair includes the given image region and the given point cloud region corresponding to the given embedding pair.

In some implementations, the embedding pairs are identified based at least in part on, for each embedding pair, a respective similarity measure between the embedding of the given image region and the embedding of the given point cloud region included in the embedding pair.

In some implementations, the embedding pairs are identified using a greedy nearest neighbor matching algorithm.

In some implementations, the visual embedding neural network and the shape embedding neural network are jointly trained using a triplet loss objective function or a contrastive loss objective function.

Particular embodiments of the subject matter described in this specification can be implemented so as to realize one or more of the following advantages.

The alignment system described in this specification can determine an alignment between an image (i.e., generated by camera) and a point cloud (i.e., generated by a surveying sensor, e.g., a lidar sensor). That is, the alignment system can determine a mapping between respective regions of the image and the point cloud that characterize the same area of an environment.

The alignment system can be used by an on-board system of a vehicle, e.g., for sensor calibration, cross-modal object localization, or object detection (as will be described in more detail below). By using the alignment system, the on-board system of the vehicle can generate planning decisions that plan the future trajectory of the vehicle and enable the vehicle to operate more safely and efficiently.

The alignment system can determine the alignment between an image and a point cloud using embeddings of image regions and embeddings of point cloud regions that are generated by respective embedding neural networks. By using embeddings generated by embedding neural networks that are trained using machine learning techniques, the alignment system can, in some cases, generate alignments more accurately than if it used embeddings composed of hand-crafted features (e.g., HOG, SIFT, or SURF features). In particular, the alignment system described in this specification uses region embeddings that are optimized (i.e., using machine learning techniques) to achieve accurate alignments. In contrast, embeddings composed of hand-crafted features are not optimized to achieve accurate alignments, and may therefore underperform the learned region embeddings described in this specification, e.g., by resulting in less accurate alignments.

The alignment system described in this specification can align sensor data more rapidly than some conventional systems, and in some cases, may consume fewer computational resources than conventional systems. More specifically, to align two sets of sensor data, the system described in this specification determines embeddings of respective regions of the two sets of sensor data, and then matches the embeddings, e.g., using a nearest-neighbor matching technique. In contrast, some conventional systems align two sets of sensor data by iteratively optimizing a set of parameters (e.g., rotation or transformation parameters) defining the alignment based on an objective function that characterizes how well the two sets of sensor data are aligned. Determining the alignment by iteratively optimizing an objective function can be computationally demanding, e.g., requiring several seconds or longer to align two data sets. In practical applications, e.g., in an on-board system of a vehicle, a latency of several seconds in aligning data sets may be infeasible, as the data sets may be outdated by the time they are aligned. The system described in this specification can, in some cases, determine alignments more rapidly than these conventional systems, and therefore can be effectively used in a greater number of practical applications, e.g., by an on-board system of a vehicle.

The alignment system can be used to generate training data for training an object detection neural network that is configured to process a point cloud to generate an output that identifies the positions of objects in the point cloud. In particular, object segmentations can be transferred from image data onto corresponding point cloud data using alignments generated by the alignment system. Segmentations of point cloud data generated in this manner can thereafter be used to train the object detection neural network. In some cases, manually segmenting images is substantially easier, faster, and more accurate than manually segmenting point cloud data. Therefore, the alignment system can simplify the generation of training data for training the object detection neural network by facilitating the transfer of segmentations from image data onto point cloud data.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a cross-modal alignment system that can determine an "alignment" between cross-modal data characterizing an environment. For example, the alignment system can determine an alignment between: (i) an image (e.g., generated by a camera) that characterizes the visual appearance of the environment, and (ii) a point cloud (e.g., generated by a lidar or radar sensor) that characterizes the three-dimensional (3D) geometry of the environment. Determining an alignment between the image and the point cloud refers to determining a mapping between respective regions of the image and the point cloud that characterize the same area of the environment. Determining an alignment between the image and the point cloud may also be referred to as "registering" the image and the point cloud, or performing "scan matching" between the image and the point cloud. Cross-modal alignments generated by the alignment system can be used by an on-board system of a vehicle for any of a variety of purposes, e.g., sensor calibration, cross-modal object localization, or object detection.

Generally, the alignment system described in this specification can be used to determine alignments between any appropriate data sets. For example, the alignment system can be used to determine an "intra-modal" alignment between two data sets of the same modality, e.g., two images or two point clouds. As another example, while this specification primarily refers to the alignment system as being used by an on-board system of a vehicle, the alignment system can be used in any of a variety of other settings as well. In a particular example, the alignment system can be used to align two medical images of a patient, e.g., a magnetic resonance image (MM) and a computed tomography (CT) image of the patient, or an ultrasound (US) image and an MM of the patient.

These features and other features are described in more detail below.

Figure 1:
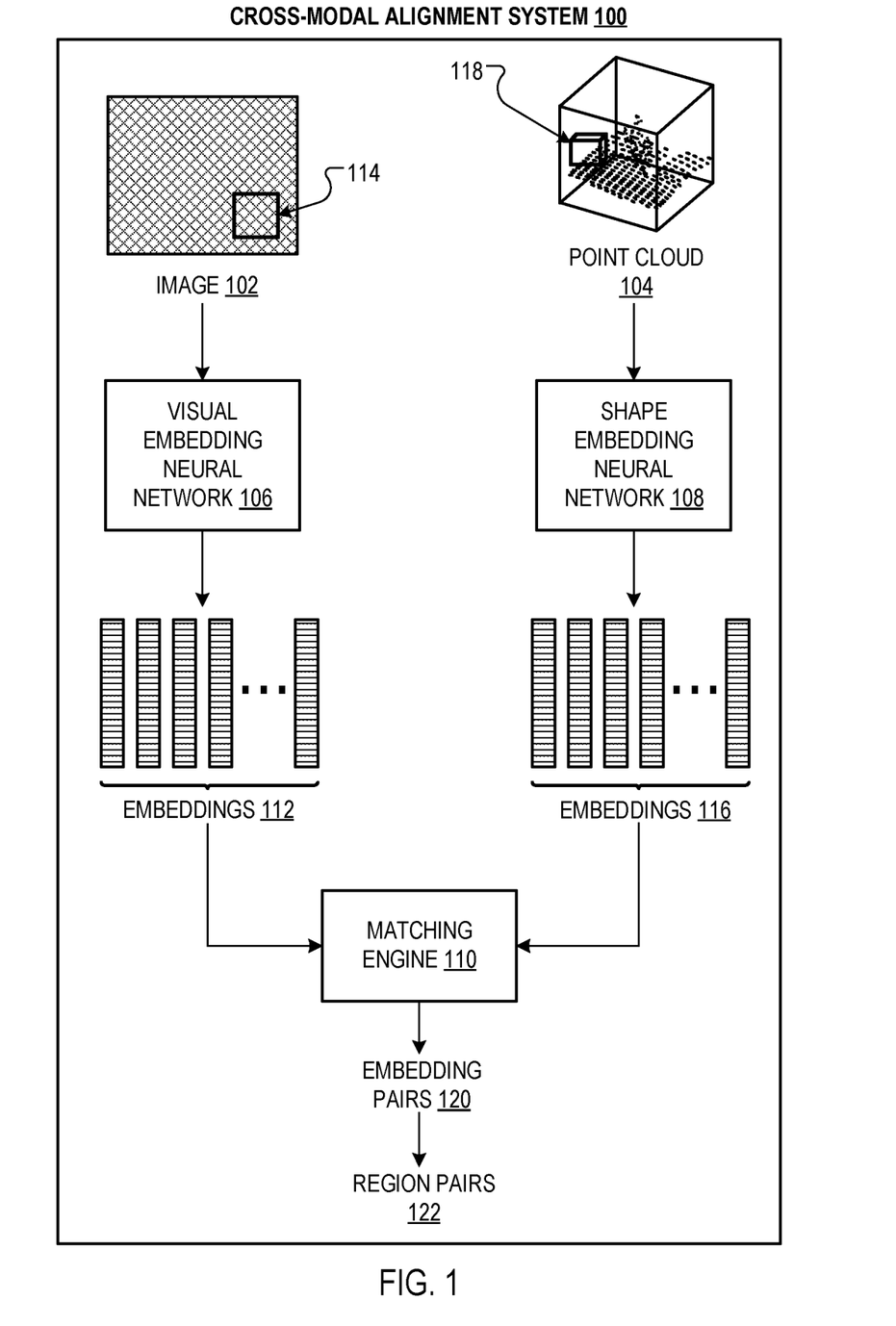
FIG. 1 shows an example cross-modal alignment system.

FIG. 1 shows an example cross-modal alignment system 100. The cross-modal alignment system 100 is an example of a system implemented as computer programs on one or more computers in one or more locations in which the systems, components, and techniques described below are implemented.

Figure 2:
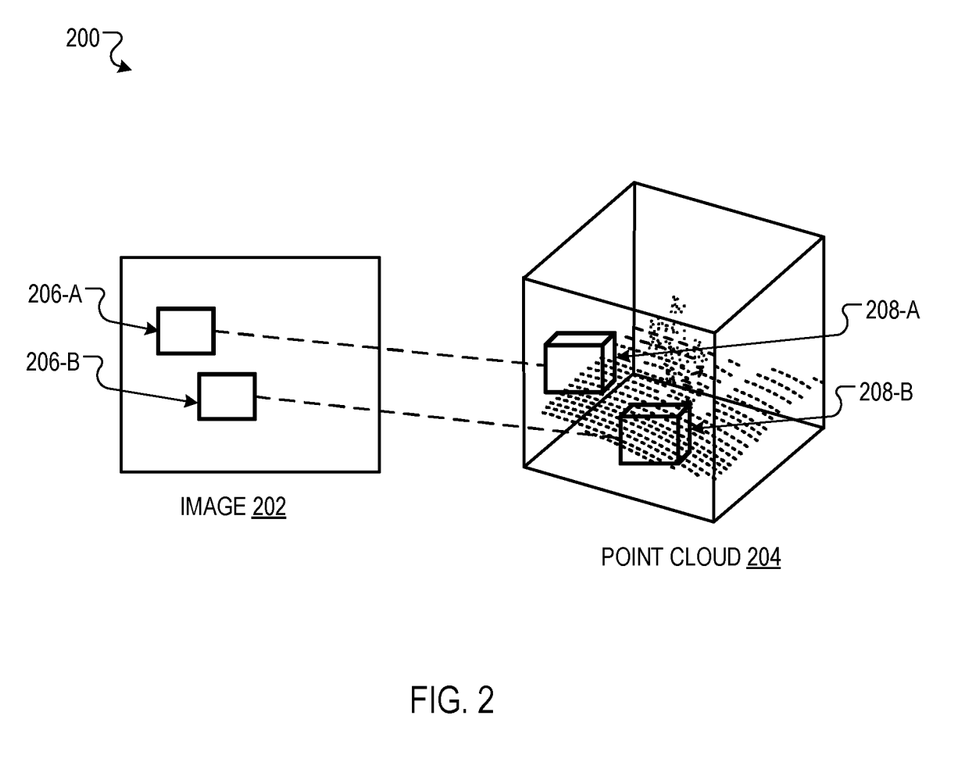
FIG. 2 is an illustration of an example of a mapping between respective regions of an image and a point cloud.

The system 100 is configured to process an image 102 (e.g., generated by a camera) and a point cloud 104 (e.g., generated by a lidar or radar sensor) that both characterize an environment to determine an "alignment" between the image 102 and the point cloud 104. The alignment between the image 102 and the point cloud 104 is defined by a mapping between respective regions of the image 102 and the point cloud 104 that characterize the same area of the environment. FIG. 2 illustrates an example of a mapping between respective regions of an image and a point cloud.

The image 102 characterizes the visual appearance of the environment, and may be captured using any appropriate type of digital camera sensor.

In one example, the image 102 may be a black-and-white image represented by a two-dimensional (2D) array of numerical values, where each component of the array corresponds to a respective area of the environment. In another example, the image 102 may be represented by a set of multiple "channels". In this example, each channel may be represented by a respective 2D array of numerical values, where each component of each channel corresponds to a respective area of the environment, and corresponding components of different channels correspond to the same area of the environment. In a particular example, the image 102 may be a red-green-blue (RGB) color image represented by a red color channel, a green color channel, and a blue color channel.

The point cloud 104 characterizes the 3D geometry of the environment, and may be captured using any appropriate type of "surveying" sensor, e.g., a lidar sensor or a radar sensor.

Generally, the point cloud 104 is represented by a collection of "data points", where each data point defines a 3D spatial position of a point on a surface in the environment. For example, each data point may be represented by a vector including respective x-, y-, and z-coordinates that define a 3D spatial position of a point on a surface in the environment with respect to a 3D coordinate system. In one example, the 3D coordinate system may be a Euclidean coordinate system centered on a vehicle on which the surveying sensor is mounted.

Optionally, each data point in the point cloud may include additional "intensity" information that characterizes, e.g., the reflectivity, texture, or density of the material at the 3D spatial position in the environment corresponding to the data point.

For example, the intensity information included in a data point in the point cloud may be defined by the strength of the reflection of a pulse of light that was transmitted by a lidar sensor and that reflected off a surface in the environment at the 3D spatial position corresponding to the data point. In this example, each data point in the point cloud may be represented by a vector including both: (i) respective x-, y-, and z-coordinates that define a 3D spatial position of a point on a surface in the environment, and (ii) an intensity value that defines the strength of the reflection of a pulse of light that reflected off a surface in the environment at the 3D spatial position.

The system 100 includes a visual embedding neural network 106, a shape embedding neural network 108, and a matching engine 110.

The system 100 uses the visual embedding neural network 106 to generate a respective embedding 112 of each of multiple regions of the image 102. An embedding of an image region refers to a representation of the image region as an ordered collection of numerical values, e.g., a vector of numerical values. A region of an image refers to a portion of the image, e.g., that is enclosed by a square or circular 2D geometrical region. For example, a region of an RGB image with channels of dimension [100,100] (i.e., with 100 rows and 100 columns) may be given by the respective portion of each channel corresponding to pixels in the square region [42:46, 91:95] (i.e., with row index between 42 and 46, and column index between 91 and 95). An example region in the image 102 is illustrated by 114.

The visual embedding neural network 106 may be configured to process the entire image 102 to generate an output that defines a respective embedding 112 of each region of the image 102. Alternatively, rather than processing the entire image 102 at once, the visual embedding neural network 106 may be configured to process individual image regions to generate respective embeddings of the image regions.

Generally, the visual embedding neural network 106 can have any appropriate neural network architecture that enables it to generate embeddings of image regions. For example, the visual embedding neural network 106 may include a set of multiple convolutional layers followed by a fully-connected output layer after the final convolutional layer.

The system 100 uses the shape embedding neural network 108 to generate a respective embedding 116 of each of multiple regions of the point cloud 104. An embedding of a point cloud region refers to a representation of the point cloud region as an ordered collection of numerical values, e.g., a vector of numerical values, e.g., a bit vector consisting of 0s and 1s. An embedding of a point cloud region can be also be referred to as, e.g., feature vector or a feature descriptor for the point cloud region. A region of a point cloud refers to a collection of data points from the point cloud, e.g., corresponding to 3D spatial positions that are enclosed in a cubical or spherical 3D geometrical region. For example, a region of a point cloud where each data point corresponds to a 3D spatial position defined by x-, y-, and z-coordinates may be given by the collection of data points corresponding to 3D spatial positions that are enclosed by the cubical region [14:18, 2:6, 44:48] (i.e., with x-coordinate value between 14 and 18, y-coordinate value between 2 and 6, and z-coordinate value between 44 and 48). An example region in the point cloud 104 is illustrated by 118.

The shape embedding neural network 108 may be configured to process the entire point cloud 104 to generate an output that defines a respective embedding 116 of each region of the point cloud 104. Alternatively, rather than processing the entire point cloud 104 at once, the shape embedding neural network 108 may be configured to process individual point cloud regions to generate respective embeddings of the point cloud regions.

Generally, the shape embedding neural network 108 can have any appropriate neural network architecture that enables it to generate embeddings of point cloud regions. For example, the shape embedding neural network 108 may have a PointNet architecture (i.e., as described with reference to: C. R. Qi, H. Su, K. Mo, and L. J. Guibas, "PointNet: Deep Learning on Points Sets for 3D Classification and Segmentation", 2017, The IEEE Conference on Computer Vision and Pattern Recognition (CVPR)), a PointNet++ architecture (i.e., as described with reference to C. R. Qi, L. Yi, H. Su, and L. J. Guibas, "PointNet++: Deep Hierarchical Feature Learning on Point Sets in a Metric Space", 2017, Advances in Neural Information Processing Systems (NIPS)), or a VoxNet architecture (i.e., as described with reference to: D. Maturana and S. Scherer, "VoxNet: a 3D Convolutional Neural Network or Real-Time Object Recognition", 2015, IEEE/RSJ International Conference of Intelligent Robots and Systems (IROS)).

The visual embedding neural network 106 and the shape embedding neural network 108 are jointly trained using an objective function that encourages two properties.

First, for an image region and a point cloud region that characterize the same area of an environment, the visual embedding neural network 106 and the shape embedding neural network 108 should generate respective embeddings that are "similar" (e.g., according to an appropriate numerical similarity measure).

Second, for an image region and a point cloud region that characterize different areas of an environment (or different environments altogether), the visual embedding neural network 106 and the shape embedding neural network 108 should generate respective embeddings that are "dissimilar" (e.g., according to an appropriate numerical similarity measure).

For example, the visual embedding neural network 106 and the shape embedding neural network 108 can be jointly trained using, e.g., a triplet loss objective function or a contrastive loss objective function.

An example process for jointly training the visual embedding neural network 106 and the shape embedding neural network 108 is described in more detail with reference to FIG. 4.

The system 100 may generate respective embeddings of any appropriate number of image regions and point cloud regions. A few examples follow.

For example, the system 100 may generate respective embeddings for each image region in a grid of image regions that covers the image 102 and for each point cloud region in a grid of point cloud regions that covers the point cloud 104. In a particular example, the image regions may be composed of non-overlapping 2D rectangular image regions, where each pixel in the image 102 is included in exactly one of the image regions. In another particular example, the point cloud regions may be composed of non-overlapping 3D rectangular point cloud regions each data point in the point cloud 104 is included in exactly one of the point cloud regions.

As another example, the system may generate respective embeddings for each image region in a grid of image regions that covers a proper subset of the image 102 and for each point cloud region in a grid of point cloud regions that covers a proper subset of the point cloud 104. In a particular example, the image regions may be composed of non-overlapping 2D rectangular image regions, where each pixel that is included in an object depicted in the image 102 is included in exactly one of the image regions. In another particular example, the point cloud regions may be composed of non-overlapping 3D rectangular point cloud regions, where each data point that is included in an object characterized by the point cloud 104 is included in exactly one of the point cloud regions.

As another example, the system may generate embeddings only for regions in the image and the point cloud having an "interest score" that satisfies a predetermined threshold. The system may determine the interest score for an image region based on, e.g., the presence of edges, corners, blobs, ridges, or a combination thereof, in the image region. The system may determine the interest score for a point cloud region based on, e.g., the complexity of the point cloud region, e.g., a sum of residuals between: (i) the points included in the region, and (ii) a linear surface fitted to the points included in the region. Generally, the system may be configured to generate embeddings for image and point cloud regions that characterize unique features of the environment that can be effectively matched between the image and the point cloud. For example, the system may refrain from generating embeddings for regions of the image or the point cloud that correspond to flat road without road markings. As another example, the system may determine that embeddings should be generated for regions of the image and the point cloud that correspond to a portion of a vehicle or a pedestrian.

The matching engine 110 is configured to process the embeddings 112 of the image regions and the embeddings 116 of the point cloud regions to identify a set of embedding pairs 120. Each embedding pair 120 specifies: (i) an embedding 112 of an image region, and (ii) an embedding 116 of a point cloud region.

The matching engine 110 attempts to identify embedding pairs 120 in a manner that maximizes (or approximately maximizes) a similarity measure between the respective embeddings included in each embedding pair 120. The similarity measure may be, e.g., an $L_2$ similarity measure, a cosine similarity measure, or any other appropriate similarity measure.

In a particular example, the matching engine 110 may use a "greedy" nearest neighbor matching algorithm to sequentially match each image region embedding 112 to a respective point cloud region embedding 116. For each given image region embedding 112, the matching engine 110 identifies the corresponding point cloud region embedding 116 which is most similar (i.e., according to a similarity measure) to the given image region embedding from among the currently unmatched point cloud region embeddings. The greedy nearest neighbor matching algorithm may terminate when each image region embedding is matched to a corresponding point cloud region embedding, or when no unmatched point cloud region embeddings remain.

More generally, the matching engine 110 can use any appropriate matching algorithm to identify the embedding pairs 120. Some examples of nearest neighbor matching algorithms are described with reference to, e.g.: M. Muja, D. G. Lowe, "Fast approximate nearest neighbors with automatic algorithm configuration", 2009, VISAPP International Conference on Computer Vision Theory and Applications.

The system 100 uses each embedding pair 120 identified by the matching engine 110 to identify a respective region pair 122 that specifies the image region and the point cloud region corresponding to the embedding pair 120. In this manner, the system 100 identifies a set of region pairs 122 that each specify an image region and a point cloud region that are predicted to characterize the same area of the environment. That is, the region pairs 122 define a mapping between respective regions of the image 102 and the point cloud 104 that are predicted to characterize the same area of the environment.

For example, a region pair 122 may specify a region of the image 102 and a region of the point cloud 104 that are both predicted to characterize the same object or the same part of the same object in the environment. Objects in the environment may be, e.g., people, animals, cars, road signs, and the like.

The mapping between corresponding image regions and point cloud regions that is defined by the regions pairs 122 can be used for any of a variety of purposes. A few examples of using the cross-modal alignment system 100 in an on-board system of a vehicle are described with reference to FIG. 3.

FIG. 2 is an illustration 200 an example of a mapping between respective regions of an image 202 and a point cloud 204 (e.g., of the sort that can be determined by the cross-modal alignment system 100 described with reference to FIG. 1). In this example, the image regions 206-A and 206-B are respectively mapped the point cloud regions 208-A and 208-B (and vice versa). That is, the image region 206-A and the point cloud region 208-A form a first "region pair", and the image region 206-B and the point cloud region 208-B form a second "region pair" (as described with reference to FIG. 1).

Figure 3:
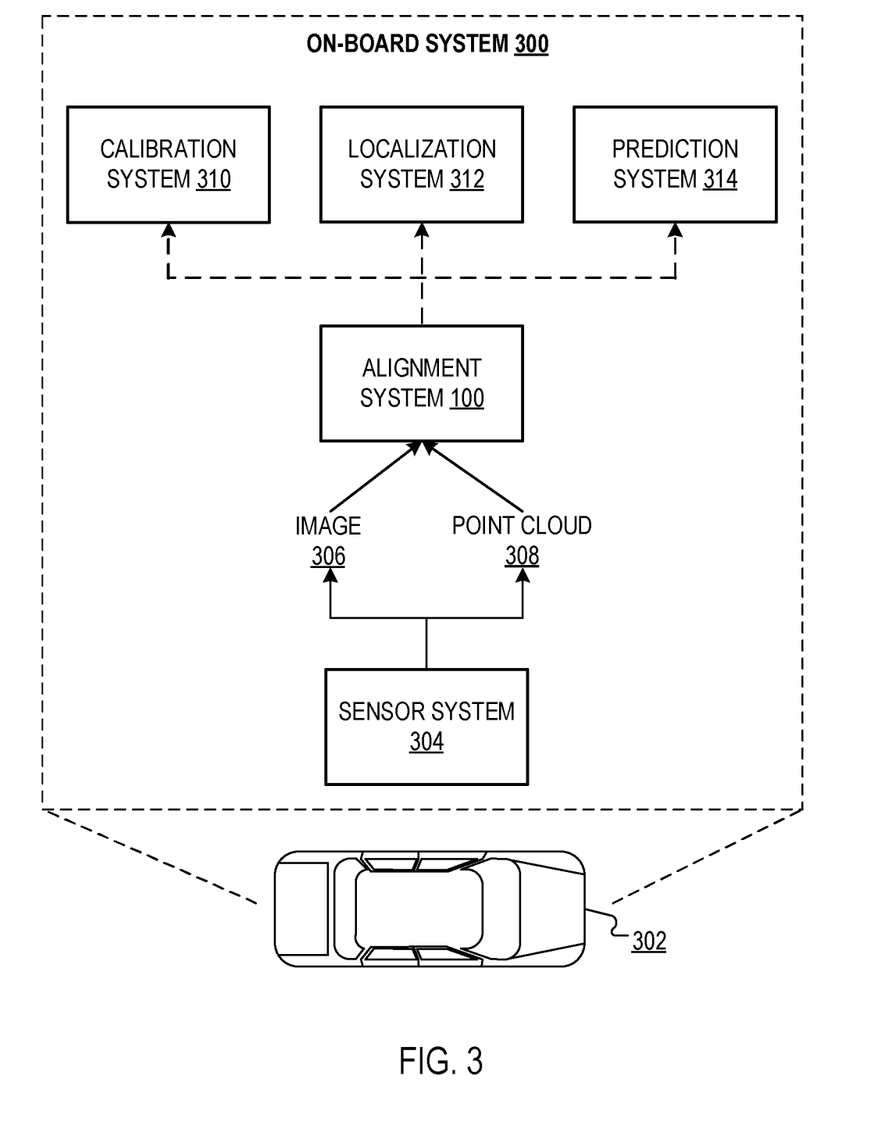
FIG. 3 is a block diagram of an example on-board system of a vehicle.

FIG. 3 is a block diagram of an example on-board system 300 of a vehicle 302. The on-board system 300 is composed of hardware and software components, some or all of which are physically located on-board the vehicle 302. As will be described in more detail below, the on-board system 300 can use the alignment system 100 (as described with reference to FIG. 1) for any of a variety of purposes.

In some cases, the on-board system 300 can make fully-autonomous or partly-autonomous driving decisions (i.e., driving decisions taken independently of the driver of the vehicle 302), present information to the driver of the vehicle 302 to assist the driver in operating the vehicle safely, or both. For example, in response to determining that another vehicle is unlikely to yield for the vehicle 302, the on-board system 300 may autonomously apply the brakes of the vehicle 302 or otherwise autonomously change the trajectory of the vehicle 302 to prevent a collision between the vehicle 302 and the other vehicle. As another example, in response to determining that another vehicle is unlikely to yield for the vehicle 302, the on-board system 300 may present an alert message to the driver of the vehicle 302 with instructions to adjust the trajectory of the vehicle 302 to avoid a collision with the other vehicle.

Although the vehicle 302 in FIG. 3 is depicted as an automobile, and the examples in this document are described with reference to automobiles, in general the vehicle 302 can be any kind of vehicle. For example, besides an automobile, the vehicle 302 can be a watercraft or an aircraft. Moreover, the on-board system 300 can include components additional to those depicted in FIG. 3 (e.g., a collision detection system or a navigation system).

The on-board system 300 includes a sensor system 304 that enables the on-board system 300 to "see" the environment in the vicinity of the vehicle 302. More specifically, the sensor system 304 includes sensors of multiple different modalities, in particular, camera sensors and surveying sensors (e.g., lidar sensors, radar sensors, or both).

The sensor system 304 continually (i.e., at each of multiple time points) generates images 306 characterizing the visual appearance of the environment in the vicinity of the vehicle and point clouds 308 characterizing the 3D geometry of the environment in the vicinity of the vehicle.

The alignment system 100 can process an image 306 and a point cloud 308 generated by the sensor system 304 to determine a mapping between respective regions of the image 306 and the point cloud 308 that are predicted to characterize the same area of the environment. The output of the alignment system 100 can be used by any of a variety of other systems on-board the vehicle 302, e.g., a calibration system 310, a localization system 312, and a prediction system 314, as will be described in more detail below.

The calibration system 310 is configured to maintain calibration data that characterizes the positions and orientations of some or all of the sensors mounted on the vehicle 302. For example, for each sensor mounted on the vehicle 302, the calibration system 310 may maintain calibration data that includes: (i) a 3D vector defining x-, y-, and z-coordinates of the position of the sensor on the vehicle, and (ii) a 3D vector defining x-, y-, and z-coordinates of the orientation of the sensor (i.e., the direction the sensor is pointing).

The calibration system 310 can continually (i.e., at each of multiple time points) check the current accuracy of the calibration data. The calibration data may become inaccurate over time due to changes in the positions and orientations of the sensors. The positions and orientations of the sensors can change over time, e.g., due to temperature variations causing slight deformations to the portion of the vehicle where the sensor is mounted, due to objects (e.g., tree branches) brushing the sensors, or due to abrupt changes in the speed of the vehicle.

The calibration system 310 can use the output of the alignment system 100 to cross-check the accuracy of the current calibration data for a camera sensor and a surveying sensor (e.g., lidar or radar sensor). For example, the calibration system 310 can use the output of the alignment system to determine the parameters of a transformation (e.g., a translation and rotation transformation) that aligns the center positions of matching regions of the image (generated by the camera sensor) and the point cloud (generated by the surveying sensor). A region of the image is said to "match" a region of the point cloud if the output of the alignment system indicates that they correspond to the same area of the environment. The calibration system 310 can determine the parameters of the transformation using any appropriate fitting method, e.g., a least squares fitting method with random sample consensus (RANSAC), or a robustified non-linear least squares fitting method.

After determining the parameters of the transformation from the image to the point cloud (or vice versa), the calibration system 310 can apply the transformation to the calibration parameters characterizing the position and orientation of the camera sensor. The results of applying the transformation to the calibration parameters for the camera sensor define an estimate for the calibration parameters characterizing the position and orientation of the surveying sensor. In response to determining that the estimate for the calibration parameters of the surveying sensor differs by at least a threshold amount from the maintained calibration parameters of the surveying sensor, the calibration system may determine that one or both of the surveying sensor and the camera sensor are miscalibrated. In response to determining that sensors are miscalibrated, the on-board system may, e.g., alert the driver of the vehicle, or cause the vehicle to pull over.

The localization system 312 can process an image 306, a point cloud 308, and data defining the position of an object in sensor data of one of the modalities (i.e., either the image 306 or the point cloud 308), to determine the position of the same object in the sensor data of the other modality.

For example, the localization system 312 can process an image 306, a point cloud 308, and data defining the position of an object in the image 306, to generate data defining the position of the same object in the point cloud 308.

As another example, the localization system 312 can process an image 306, a point cloud 308, and data defining the position of an object in the point cloud 308, to generate data defining the position of the same object in the image 306.

The position of an object in an image or in a point cloud can be represented in any appropriate manner. For example, the position of an object in an image can be represented by a 2D bounding box that encloses the object in the image. As another example, the position of an object in a point cloud can be represented by a 3D bounding box that encloses the object in the point cloud.

The localization system 312 can use the alignment system 100 to identify the position of an object in a point cloud based on the position of the object in an image. For example, the localization system 312 can use the alignment system 100 to generate: (i) embeddings of one or more regions of the image that cover the object in the image, and (ii) embeddings of a grid of regions in the point cloud that cover the entire point cloud.

The localization system 312 can map the image regions that cover the object in the image to corresponding point cloud regions, e.g., by matching the embeddings of the image regions to corresponding embeddings of point cloud regions, e.g., as described with reference to FIG. 1. Thereafter, the localization system 312 can determine the position of the object in the point cloud based on the point cloud regions that are mapped onto by the image regions that cover the object in the image.

Similarly, the localization system 312 can also use the alignment system 100 to identify the position of an object in an image based on the position of the object in a point cloud.

The on-board system 300 can use the localization system 312 in any of a variety of circumstances. For example, the on-board system 300 may track another vehicle using camera sensor data while the other vehicle is out of range of the lidar sensor of the vehicle 302. Once the other vehicle comes into range of the lidar sensor of the vehicle 302, the on-board system 300 can use the localization system 312 to determine the position of the other vehicle in the point cloud data generated by the lidar sensor. Having localized the other vehicle in both the camera sensor data and the lidar sensor data, the on-board system 300 can use sensor data of both modalities, e.g., to predict the behavior of the other vehicle.

The prediction system 314 is configured to process images 306 and point clouds 308 generated by the sensor system 304, e.g., to detect and identify objects (e.g., vehicles, pedestrians, road signs, and the like) in the vicinity of the vehicle 302. The prediction system 314 may use the alignment system 100 to align image data and point cloud data generated by the sensor system before processing it, e.g., using one or more neural networks.

In one example, the prediction system 314 may use the alignment system 100 to generate a mapping between respective regions of an image 306 and a point cloud 308 that are predicted to characterize the same areas of the environment. Thereafter, the prediction system 314 may use the mapping to project the point cloud 308 onto a 2D image plane that is aligned with the image 306, and then provide the projected point cloud 308 and the image 306 to an object detection neural network.

In some cases, data characterizing the relative positions and orientations of a camera sensor and a surveying sensor can be used to approximately align the images generated by the camera sensor and the point clouds generated by the surveying sensor without using the alignment system 100. However, aligning images and point clouds based on the relative positions of the camera sensor and surveying sensor that generated them can be inaccurate, particularly when the vehicle is in motion. More specifically, the camera sensor and the surveying sensor often generate data at different time points (e.g., 0.2 seconds apart). In the duration of time that elapses between when the camera sensor generates an image and when the surveying sensor generates a point cloud, the vehicle can move relative to the environment. In this situation, attempting to align the image and the point cloud based on the relative positions and orientations of the camera and surveying sensors can result in an inaccurate alignment. On the other hand, the alignment system 100 can accurately align images and point clouds when the vehicle 302 is in motion, even if the relative positions and orientations of the surveying and camera sensors are inaccurate or unknown.

In addition to being used by an on-board system of a vehicle (e.g., as described with reference to FIG. 3), the alignment system can be used in a variety of other applications. For example, the alignment system can be used to generate training data for training an object detection neural network that is configured to process a point cloud to generate an output that identifies the positions of objects in the point cloud. Manually segmenting objects in point clouds for use as training data for training the object detection neural network may be difficult, time-consuming, and expensive. The alignment system can obviate these challenges, since it can be used to transfer segmentations from images (which can be readily obtained) onto corresponding point cloud data, which can subsequently be used to train the object detection neural network.

Figure 4:
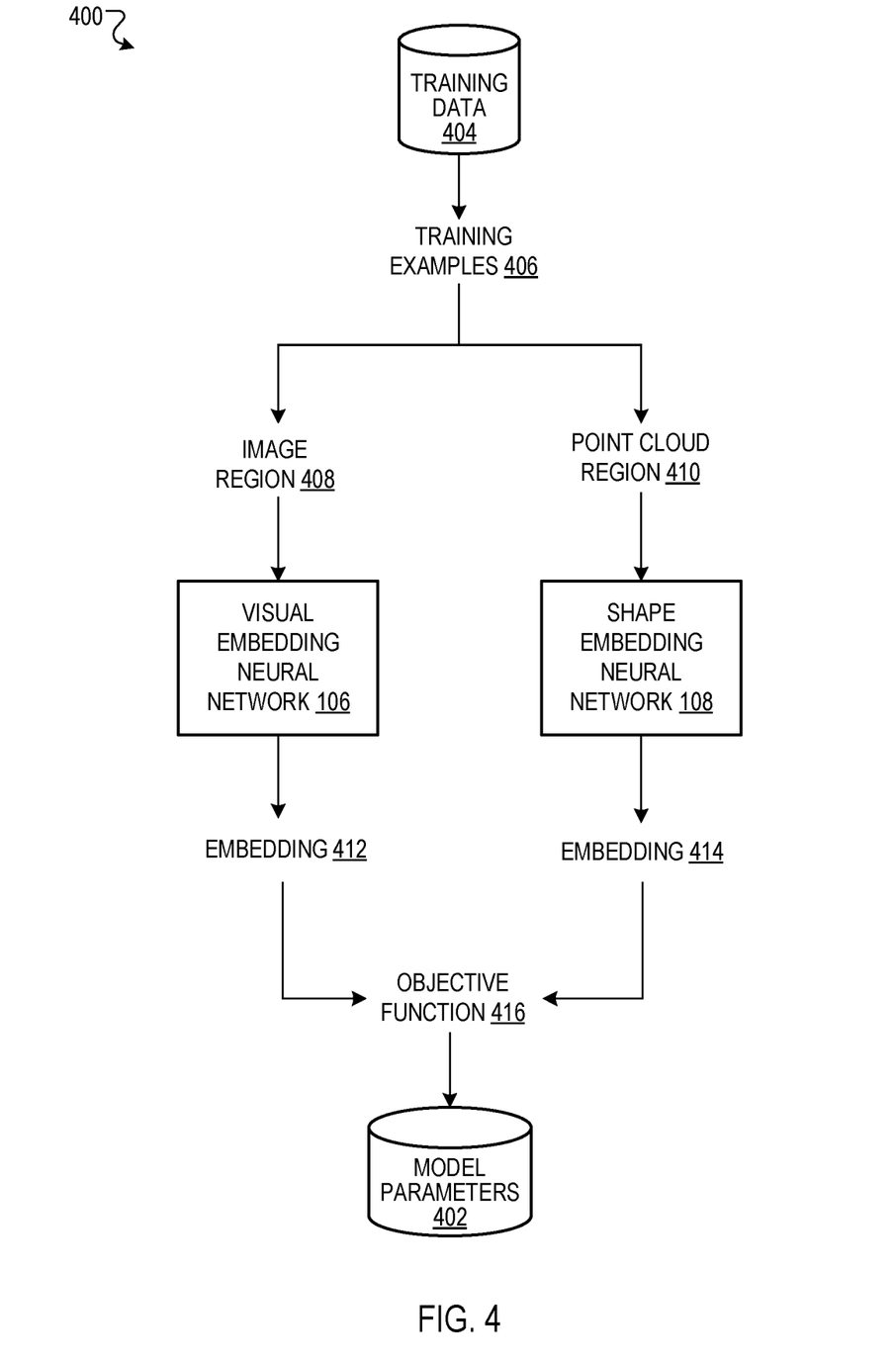
FIG. 4 illustrates an example data flow for jointly training the visual embedding neural network and the shape embedding neural network.

FIG. 4 illustrates an example data flow 400 for jointly training the visual embedding neural network 106 and the shape embedding neural network 108. Training the visual embedding neural network 106 and the shape embedding neural network 108 refers to determining trained values of their respective model parameters 402.

The visual embedding neural network 106 and the shape embedding neural network 108 are trained on a set of training data 404 that includes multiple training examples. Each training example includes a region of an image and a region of a point cloud. Some of the training examples are "positive" training examples, where the image region and the point cloud region characterize the same area of an environment. The remainder of the training examples are "negative" training examples, where the image region and the point cloud region characterize different areas of an environment (or different environment altogether).

The training examples of the training data 404 can be generated in any of a variety of ways.

For example, positive training examples can be generated by using a camera sensor and a surveying sensor that have known positions and orientations relative to one another to simultaneously capture an image and a point cloud characterizing an environment. The relative positions and orientations of the sensors can be used to align the image and the point cloud, and one or more training examples can be generated by extracting pairs of corresponding regions from the aligned sensor data.

As another example, positive training examples can be manually generated by human annotation, where a person manually annotates corresponding image regions and point cloud regions that characterize the same area of the environment.

As another example, negative training examples can be generated by randomly pairing image regions and point cloud regions characterizing areas of different environments.

At each of multiple training iterations, a "batch" (i.e., set) of one or more training examples 406 are selected (e.g., randomly) from the training data 404.

For each training example 406 in the batch, the visual embedding neural network 106 processes the image region 408 from the training example 406 in accordance with current values of the model parameters 402 to generate an embedding 412 of the image region 408. Similarly, the shape embedding neural network 108 processes the point cloud region 410 from the training example 406 in accordance with current values of the model parameters 402 to generate an embedding 414 of the point cloud region 410.

The embeddings of the image regions 408 and the point cloud regions 410 from the training examples 406 of the current batch are used to evaluate an objective function 416. Gradients of the objective function 416 are computed (e.g., using backpropagation), and are thereafter used to update the current values of the model parameters 402 (e.g., using an RMSprop or Adam gradient descent optimization procedure).

As described earlier, the objective function 416 broadly encourages the visual embedding neural network 106 and the shape embedding neural network 108 to generate similar embeddings of image regions and point cloud regions if and only if they characterize the same area of an environment. For example, the objective function may be a triplet loss objective function or a contrastive loss objective function.

The model parameters 402 of the visual embedding neural network 106 and the shape embedding neural network 108 may be trained until a training termination criterion is satisfied, e.g., when a predetermined number of training iterations have been performed. The trained values of the model parameters 402 may be transmitted to an on-board system of a vehicle (e.g., as described with reference to FIG. 3) over any appropriate wired or wireless connection.

Figure 5:
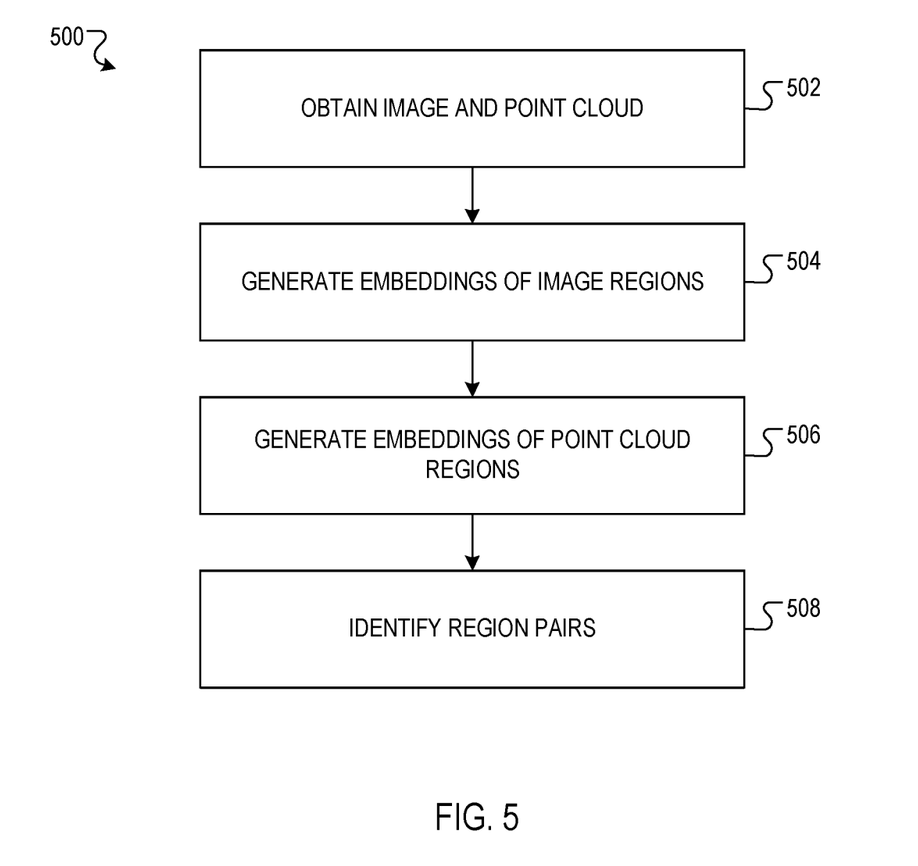
FIG. 5 is a flow diagram of an example process for determining a mapping between respective regions of an image and a point cloud that characterize the same area of an environment.

FIG. 5 is a flow diagram of an example process 500 for determining a mapping between respective regions of an image and a point cloud that characterize the same area of an environment. For convenience, the process 500 will be described as being performed by a system of one or more computers located in one or more locations. For example, a cross-modal alignment system, e.g., the cross-modal alignment system 100 of FIG. 1, appropriately programmed in accordance with this specification, can perform the process 500.

The system obtains an image and a point cloud region (502). The image is generated by a camera sensor and characterizes a visual appearance of the environment. The point cloud is generated by a surveying sensor and characterizes a 3D geometry of the environment. The image can be represented in any appropriate format, e.g., as a black and white image or as a color image. The point cloud can be represented as a collection of data points, where each data point defines a respective 3D spatial position of a point on a surface in the environment. Optionally, each data point in the point cloud may include additional "intensity" information that characterizes, e.g., the reflectivity, texture, or density of the material at the 3D spatial position in the environment corresponding to the data point.

The system processes each of multiple regions of the image using a visual embedding neural network to generate a respective embedding of each of the image regions (504). Each image region may corresponding to a portion of the image enclosed by a 2D bounding region of any appropriate shape, e.g., a 2D bounding box. The system may generate respective embeddings for each image region in a grid of image regions that covers the entire image, or for each image region in a set of image regions that covers a portion of the image (e.g., a portion of the image that depicts an object).

The system processes each of multiple regions of the point cloud using a shape embedding neural network to generate a respective embedding of each of the point cloud regions (506). Each point cloud region may correspond to a portion of the point cloud (i.e., a set of data points in the point cloud) corresponding to spatial positions enclosed by a 3D spatial bounding region of any appropriate shape, e.g., a 3D bounding box. The system may generate respective embeddings for each point cloud region in a grid of point cloud regions that covers the entire point cloud, or for each point cloud region in a set of point cloud regions that covers a portion of the point cloud (e.g., a portion of the point cloud that corresponds to an object).

The system identifies a set of multiple region pairs using the embeddings of the image regions and the embeddings of the point cloud regions (508) Each region pair specifies an image region and a point cloud region that characterize the same area of the environment. To identify the region pairs, the system uses a matching algorithm (e.g., a nearest neighbor matching algorithm) to identify a set of multiple embedding pairs, each of which specifies an embedding of an image region and an embedding of a point cloud region. The system uses each embedding pair to identify a respective region pair that specifies the image region and the point cloud region corresponding to the embedding pair. The region pairs define a mapping between respective regions of the image and the point cloud that are predicted to characterize the same area of the environment.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
    obtaining: (i) an image, generated by a camera sensor, that characterizes a visual appearance of an environment, and (ii) a point cloud comprising a collection of data points, generated by a surveying sensor, that characterizes a three-dimensional geometry of the environment, wherein each data point defines a respective three-dimensional spatial position of a point on a surface in the environment;
    processing each of a plurality of regions of the image using a visual embedding neural network to generate a respective image region embedding of each of the image regions;
    processing each of a plurality of regions of the point cloud using a shape embedding neural network to generate a respective point cloud region embedding of each of the point cloud regions;
    determining a plurality of similarity scores, wherein each similarity score measures a similarity between a respective image region embedding and a respective point cloud region embedding;
    identifying a plurality of image region embedding point cloud region embedding pairs that collectively define an alignment of the image and the point cloud based on the plurality of similarity scores, wherein each image region embedding-point cloud region embedding pair comprises an image region embedding of a respective image region and a point cloud region embedding of a respective point cloud region.

2. The method of claim 1, wherein the surveying sensor is a lidar sensor or a radar sensor.

3. The method of claim 1, wherein the camera sensor and the surveying sensor are mounted on a vehicle.

4. The method of claim 1, wherein each data point in the point cloud additionally defines a strength of a reflection of a pulse of light that was transmitted by the surveying sensor and that reflected from the point on the surface of the environment at the three-dimensional spatial position defined by the data point.

5. The method of claim 1, further comprising:
    using the aligned of the image and the point cloud to determine whether the camera sensor and the surveying sensor are accurately calibrated.

6. The method of claim 1, further comprising:
    obtaining data defining a position of an object in the image; and
    identifying a corresponding position of the object in the point cloud based on: (i) the position of the object in the image, and (ii) the alignment of the image and the point cloud.

7. The method of claim 6, wherein identifying the corresponding position of the object in the point cloud based on: (i) the position of the object in the image, and (ii) the alignment of the image and the point cloud, comprises:
    identifying particular image region embedding-point cloud region embedding pairs, wherein for each particular image region embedding-point cloud region embedding pair, the image region embedding characterizes an image region that corresponds to the position of the object in the image; and
    determining the position of the object in the point cloud based on the respective point cloud regions characterized by the point cloud region embeddings of the particular image region embedding-point cloud region embedding pairs.

8. The method of claim 1, further comprising:
    obtaining data defining a position of an object in the point cloud; and
    identifying a corresponding position of the object in the image based on: (i) the position of the object in the point cloud, and (ii) the alignment of the image and the point cloud.

9. The method of claim 8, wherein identifying the corresponding position of the object in the image based on: (i) the position of the object in the point cloud, and (ii) the alignment of the image and the point cloud, comprises:
    identifying particular image region embedding-point cloud region embedding pairs, wherein for each particular image region embedding-point cloud region embedding pair, the point cloud region embedding characterizes a point cloud region that corresponds to the position of the object in the point cloud; and
    determining the position of the object in the image based on the respective image regions characterized by the image region embeddings of the particular image region embedding-point cloud region embedding pairs.

10. The method of claim 1, further comprising:
    projecting the point cloud onto a two-dimensional image plane that is aligned with the image using the alignment of the image and the point cloud; and
    processing the image and the projected point cloud using a neural network to generate a neural network output.

11. The method of claim 10, wherein the neural network output comprises data identifying positions of objects in the environment.

12. The method of claim 1, wherein the plurality of image regions cover the image.

13. The method of claim 1, wherein the plurality of point cloud regions cover the point cloud.

14. The method of claim 1, wherein the plurality of image region embedding-point cloud region embedding pairs are identified using a greedy nearest neighbor matching algorithm.

15. The method of claim 1, wherein the visual embedding neural network and the shape embedding neural network are jointly trained using a triplet loss objective function or a contrastive loss objective function.

16. One or more non-transitory computer storage media storing instructions that when executed by one or more computers cause the one or more computers to perform operations comprising:
- obtaining: (i) an image, generated by a camera sensor, that characterizes a visual appearance of an environment, and (ii) a point cloud comprising a collection of data points, generated by a surveying sensor, that characterizes a three-dimensional geometry of the environment, wherein each data point defines a respective three-dimensional spatial position of a point on a surface in the environment;
- processing each of a plurality of regions of the image using a visual embedding neural network to generate a respective image region embedding of each of the image regions;
- processing each of a plurality of regions of the point cloud using a shape embedding neural network to generate a respective point cloud region embedding of each of the point cloud regions;
- determining a plurality of similarity scores, wherein each similarity score measures a similarity between a respective image region embedding and a respective point cloud region embedding; and
- identifying a plurality of image region embedding-point cloud region embedding pairs that collectively define an alignment of the image and the point cloud based on the plurality of similarity scores, wherein each image region embedding-point cloud region embedding pair comprises an image region embedding of a respective image region and a point cloud region embedding of a respective point cloud region.

17. The non-transitory computer storage media of claim 16, wherein the surveying sensor is a lidar sensor or a radar sensor.

18. A system comprising:
- one or more computers; and
- one or more storage devices communicatively coupled to the one or more computers, wherein the one or more storage devices store instructions that, when executed by the one or more computers, cause the one or more computers to perform operations comprising:
  - obtaining: (i) an image, generated by a camera sensor, that characterizes a visual appearance of an environment, and (ii) a point cloud comprising a collection of data points, generated by a surveying sensor, that characterizes a three-dimensional geometry of the environment, wherein each data point defines a respective three-dimensional spatial position of a point on a surface in the environment;
  - processing each of a plurality of regions of the image using a visual embedding neural network to generate a respective image region embedding of each of the image regions;
  - processing each of a plurality of regions of the point cloud using a shape embedding neural network to generate a respective point cloud region embedding of each of the point cloud regions;
  - determining a plurality of similarity scores, wherein each similarity score measures a similarity between a respective image region embedding and a respective point cloud region embedding; and
  - identifying a plurality of image region embedding-point cloud region embedding pairs that collectively define an alignment of the image and the point cloud based on the plurality of similarity scores, wherein each image region embedding-point cloud region embedding pair comprises an image region embedding of a respective image region and a point cloud region embedding of a respective point cloud region.

19. The system of claim 18, wherein the surveying sensor is a lidar sensor or a radar sensor.

20. The system of claim 18, wherein the camera sensor and the surveying sensor are mounted on a vehicle.

* * * * *